United States Patent
Jo et al.

(10) Patent No.: US 8,099,793 B2
(45) Date of Patent: Jan. 17, 2012

(54) SCANNING PROBE MICROSCOPE WITH AUTOMATIC PROBE REPLACEMENT FUNCTION

(75) Inventors: Hyeong Chan Jo, Suwon (KR); Hong Jae Lim, Suwon (KR); Seung Jun Shin, Seoul (KR); Joon Hui Kim, Seoul (KR); Yong Seok Kim, Seoul (KR); Sang-il Park, Seongnam (KR)

(73) Assignee: Park Systems Corp., Suwon (KR)

( * ) Notice: Subject to any disclaimer, the term of this patent is extended or adjusted under 35 U.S.C. 154(b) by 120 days.

(21) Appl. No.: 12/569,680

(22) Filed: Sep. 29, 2009

(65) Prior Publication Data

US 2010/0037360 A1 Feb. 11, 2010

Related U.S. Application Data

(63) Continuation-in-part of application No. 11/872,614, filed on Oct. 15, 2007, now Pat. No. 7,709,791.

(30) Foreign Application Priority Data

Dec. 21, 2006 (KR) .................. 10-2006-0132038

(51) Int. Cl.
*H01J 37/00* (2006.01)
(52) U.S. Cl. ............................................. 850/53; 850/40
(58) Field of Classification Search .................. 850/1, 2, 850/40, 53; 73/105
See application file for complete search history.

(56) References Cited

U.S. PATENT DOCUMENTS

| | | | | |
|---|---|---|---|---|
| 5,376,790 | A * | 12/1994 | Linker et al. | 850/2 |
| 5,705,814 | A * | 1/1998 | Young et al. | 850/2 |
| 6,093,930 | A * | 7/2000 | Boyette et al. | 850/53 |

* cited by examiner

*Primary Examiner* — Kiet Nguyen
(74) *Attorney, Agent, or Firm* — Patterson & Sheridan, LLP

(57) ABSTRACT

An automatic probe exchange system for a scanning probe microscope (SPM) exchanges probes between a probe mount on the SPM and a probe mount on a probe tray based on differential magnetic force. When the magnetic force on the SPM side is greater, the probe is attached to the probe mount on the SPM. When the magnetic force on the probe tray side is greater, the probe is attached to the probe mount on the probe tray. The magnetic force on the probe tray side is varied by moving the magnets that generate the magnetic force on the probe tray side closer to or further from the probe.

19 Claims, 16 Drawing Sheets

SCANNING PROBE MICROSCOPE WITH AUTOMATIC PROBE REPLACEMENT FUNCTION

CROSS-REFERENCE TO RELATED APPLICATIONS

This application is a continuation-in-part of U.S. patent application Ser. No. 11/872,614, filed on Oct. 15, 2007, now U.S. Pat. No. 7,709,791.

BACKGROUND OF THE INVENTION

1. Field of the Invention

The present invention relates to a scanning probe microscope, a probe of which can be automatically replaced, and more particularly, to a scanning probe microscope, a probe of which can be automatically replaced and the replacement probe can be attached to an exact position.

2. Description of the Related Art

Scanning probe microscopes (SPMs) are microscopes having a resolution in the nano-scale range, and show surfaces of samples or electrical properties of the samples as images. Some examples of SPMs are atomic force microscopes (AFMs), magnetic force microscopes (MFMs), and scanning capacitance microscopes (SCMs).

In a conventional SPM, a tip of a probe moves while contacting a surface of a sample or moves while maintaining a predetermined distance from the surface of the sample in order to analyze the shape of the surface of the sample or the electrical properties of the sample. As described above, since the tip of the probe in the conventional SPM moves while contacting the surface of the sample or maintaining a constant distance from the surface of the sample, the probe or the tip of the probe can be damaged when the conventional SPM operates. Therefore, the probe of the conventional SPM is fabricated in order for the probe to be replaced.

However, in the conventional SPM, the tip of the probe must be manually replaced by a user, and thus, it is inconvenient to do so. Additionally, since the conventional SPM represents properties of the surface of the sample using the tip of a few micrometers or a few nanometers in size as images, the replacement probe must be attached onto an exact position. However, in the conventional SPM, the position of the tip of the probe is changed whenever the probe is replaced, and thus, the positions of optical systems related to the probe must be rearranged after replacing the probe.

SUMMARY OF THE INVENTION

The present invention provides a scanning probe microscope (SPM), in which a probe is automatically replaced and the replacement probe is attached onto an exact position.

According to an aspect of the present invention, there is provided a scanning probe microscope (SPM) including: a first scanner that has a carrier holder, and changes a position of the carrier holder in a straight line; a second scanner changing a position of a sample on a plane; and a tray being able to store a spare carrier and a spare probe attached to the spare carrier, wherein the carrier holder includes a plurality of protrusions.

The SPM may further include: a carrier and a probe attached to the carrier, and the carrier may be attached onto the carrier holder and detached from the carrier holder and may include a plurality of holes corresponding to the protrusions of the carrier holder.

The tray may include a plurality of protrusions.

The SPM may further include: a carrier and a probe attached to the carrier, and the carrier may be attached onto the carrier holder and detached from the carrier holder and may include a plurality of holes or recesses corresponding to the protrusions of the carrier holder and a plurality of holes or recesses corresponding to the protrusions of the tray.

The carrier may be formed of metal.

The carrier holder may be formed of a permanent magnet or an electromagnet, may include a portion formed of a permanent magnet or an electromagnet, or include a vacuum chuck.

The tray may be formed of a permanent magnet or an electromagnet, or may include a portion formed of a permanent magnet or an electromagnet.

The carrier holder may include three protrusions that are hemispherical.

According to another aspect of the invention, an automatic probe exchange system for an SPM exchanges probes between a probe mount on the SPM and a probe mount on a probe tray based on differential magnetic force. When the magnetic force on the SPM side is greater, the probe is attached to the probe mount on the SPM. When the magnetic force on the probe tray side is greater, the probe is attached to the probe mount on the probe tray. The magnetic force on the probe tray side is varied by moving the magnets that generate the magnetic force on the probe tray side closer to or further from the probe.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Hereinafter, the present invention will be described in detail with reference to accompanying drawings.

Figure 1:
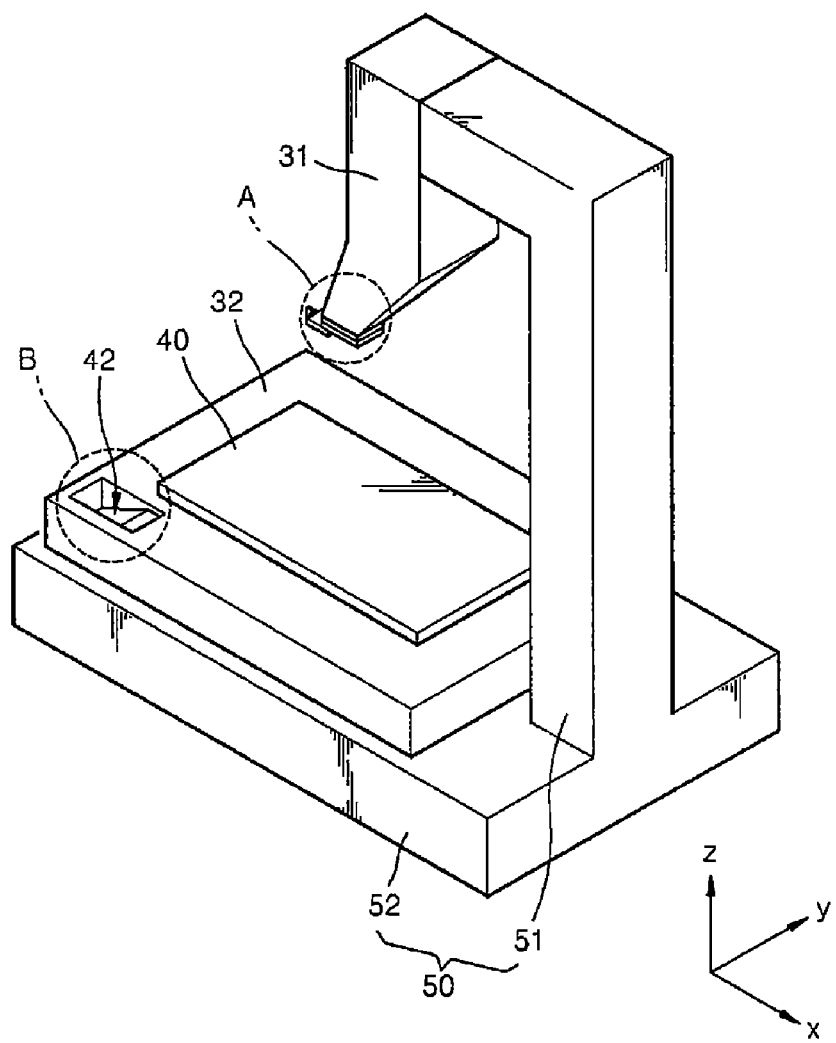
FIG. 1 is a schematic perspective view of a scanning probe microscope (SPM) according to an embodiment of the present invention.

FIG. 1 is a schematic perspective view of a scanning probe microscope (SPM) according to an embodiment of the present invention. Referring to FIG. 1, the SPM according to the current embodiment includes a first scanner 31, a second scanner 32, and a tray 42 that stores a spare probe. If necessary, the SPM can further include a frame 50 that includes a first frame 51 supporting the first scanner 31 and a second frame 52 supporting the second scanner 32, as shown in FIG. 1. Additionally, a position of the tray 42 is not limited to the position shown in FIG. 1, and thus, the position of the tray 42 can be located on various other locations of the SPM.

The first scanner 31 includes a carrier holder 30 (refer to FIG. 2A) on an end portion thereof, and moves the carrier holder 30 in a straight line in a z-axis direction. Hence, when a carrier 20, to which the probe is attached, is attached to the carrier holder 30, the first scanner 31 moves the probe in the straight line in the z-axis direction. The second scanner 32 changes a position of a sample 40 on an x-y plane.

Figure 2A:
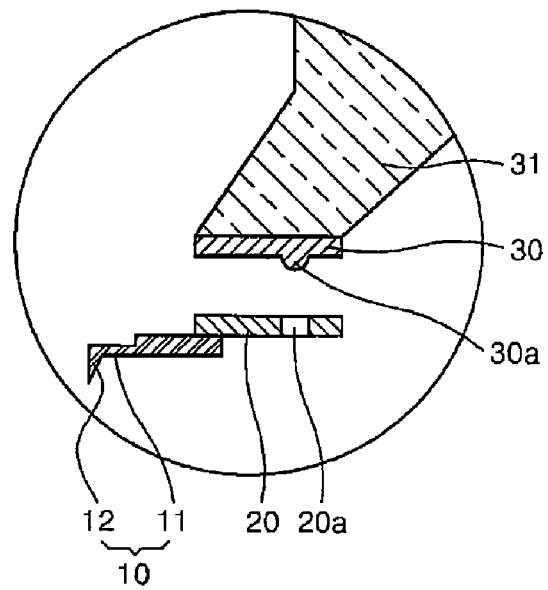
FIG. 2A is a cross-sectional side view of portion A of FIG. 1, according to an embodiment of the present invention.
Figure 2B:
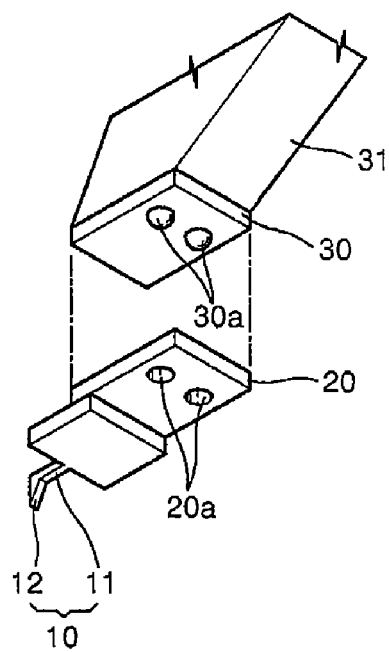
FIG. 2B is an exploded perspective view of portion A of FIG. 1, according to an embodiment of the present invention.

FIG. 2A is a schematic cross-sectional view of portion A in FIG. 1, and FIG. 2B is an exploded perspective view of portion A in FIG. 1, according to one embodiment of the present invention. Referring to FIG. 1 and FIG. 2B, the carrier holder 30 includes a plurality of protrusions 30a. In FIGS. 2A and 2B, two protrusions 30a are disposed.

The carrier 20 can be attached onto the carrier holder 30, and the probe 10 is adhered onto the carrier 20. The probe 10 includes a cantilever 11 and a tip 12 on an end of the cantilever 11, and is generally formed as a semiconductor chip. The chip is generally 1.6 mm in width and 3.4 mm in length. The cantilever 11, having a length of about 100 µm, is exposed from a side of the chip, and the tip 12 is formed on the end of the cantilever 11. In the current embodiment and other embodiments of the present invention, the probe 10 is defined to include the semiconductor chip, the cantilever 11, and the tip 12, for the convenience of explanation. Since the probe 10 is very small, the probe 10 is attached onto the carrier 20 in order for the probe 10 to be easily manipulated. The probe 10 can be attached to the carrier 20 using an adhesive or various other methods. In FIGS. 2A and 2B, parts of the probe 10 and the carrier 20 are not drawn to actual scale, and the parts of the probe 10 and the carrier 20 are schematically disclosed for convenience of explanation.

As described above, in the SPM of the current embodiment, the carrier holder 30, which is formed on the end portion of the first scanner 31, includes the protrusions 30a. Additionally, the carrier 20, on which the probe 10 is attached, includes a plurality of holes 20a that correspond to the protrusions 30a of the carrier holder 30. Alternatively, a plurality of recesses, not the holes 20a as shown in FIGS. 2A and 2B, can be formed, and the recesses can correspond to the protrusions 30a formed on the carrier holder 30 at the end portion of the first scanner 31. In this case, the recesses may not be formed as spheres, however, can be formed as various shapes, such as slots. Hereinafter, the case where the holes 20a are formed in the carrier 20 will be described.

The carrier 20, on which the probe 10 is attached, is adhered onto the carrier holder 30 on the end portion of the first scanner 31. The carrier 20 is formed of a metal material. In addition, the carrier holder 30 can be formed of a permanent magnet or an electromagnet, or can have portions of the carrier holder 30 formed of the permanent magnet or the electromagnet, for example, the protrusions 30a. Therefore, the carrier 20 is attached onto the carrier holder 30 using electromagnetic forces. When the carrier 20, to which the probe 10 is attached, is detached from the carrier holder 30, the user can easily manually remove the carrier 20. Additionally, if the carrier holder 30 is formed of an electromagnet or has a portion formed of an electromagnet, the carrier 20 can be attached to or detached from the carrier holder 30 automatically using the properties of electromagnets. Further, the carrier holder 30 can have a vacuum chuck, and an adhesion force of the carrier holder 30 can be controlled by controlling the suction force of the vacuum chuck, and accordingly, the carrier 20 can be attached to or detached from the carrier holder 30.

According to the SPM of the current embodiment, when the probe 10 or the carrier 20, to which the probe 10 is attached, attached to the carrier holder 30 at the end portion of the first scanner 31, needs to be replaced, the end portion of the first scanner 31 moves to an upper portion of the tray 42 (refer to FIG. 1), and then, the spare probe (or a spare carrier to which the spare probe is attached) stored in the tray 42 is attached to the carrier holder 30, which is at the end portion of the first scanner 31. Before this operation, the probe 10 that was used is detached from the carrier holder 30, which is at the end portion of the first scanner 31. Additionally, although the end portion of the first scanner 31 is depicted not to be able to move to the upper portion of the tray 42 in FIG. 1, this is just for the convenience of depiction, and an actuator that can change the position of the first scanner 31 can be further formed on the first frame 51 that supports the first scanner 31. Furthermore, although it is described that the end portion of the first scanner 31 is moved onto the upper portion of the tray 42 in the current embodiment, the tray 42 can be formed on the second scanner 32, and the second scanner 32 can move on the x-y plane so that the tray 42 can be located under the end portion of the first scanner 31. Then, the first scanner 31 can move the end portion of the first scanner 31 in the z-axis direction, and accordingly, the spare probe (or the spare carrier to which the spare probe is attached) stored in the tray 42 can be attached onto the carrier holder 30 at the end portion of the first scanner 31.

According to the conventional SPM, when the replacement probe is attached onto the carrier holder portion, the position of the tip is changed whenever the probe is replaced, and thus, the positions of optical systems that are related to the probe must be rearranged after replacing the probe. However, according to the SPM of the current embodiment, the carrier holder 30, which has the protrusions 30a, is disposed on the end portion of the first scanner 31, and the carrier 20 that is attached to the carrier holder 30 also includes the holes 20a corresponding to the protrusions 30a of the carrier holder 30. Therefore, when the carrier 20, to which the probe 10 is attached, is attached onto the carrier holder 30, the protrusions 30a of the carrier holder 30 and the holes 20a of the carrier 20 are coupled to each other, and thus, the probe 10 can be attached on a predetermined position with regard to the carrier holder 30. Therefore, the problem of changing the positions of the tip whenever the probe is replaced and the optical systems relating to the probe as in the conventional SPM can be solved.

As a comparative example of the SPM with the current embodiment, an optical unit including an image pickup device such as a charge-coupled device (CCD) can be disposed in the SPM in order to determine whether the end portion of the first scanner 31 has exactly moved to the upper portion of the tray 42 (refer to FIG. 1). Then, the spare probe stored in the tray 42 can be attached to the carrier holder 30 at the end portion of the first scanner 31. The optical unit is installed because the relative position of the end portion of the first scanner 31 with respect to the tray 42 must be exact in order to attach the spare probe stored in the tray onto the carrier holder 30 at the end portion of the first scanner 31.

However, the SPM according to the current embodiment of the present invention does not require the optical unit as described above due to the fact that since the position of the tray 42 is set in advance, the end portion of the first scanner 31 simply moves to the peripheral portion of the tray 42, and then, the protrusions 30a of the carrier holder 30 and the holes 20a of the carrier 20 to which the probe 10 is attached have a function of automatic arrangement. That is, in the SPM of the current embodiment of the present invention, since the carrier holder 30 at the end portion of the first scanner 31 includes the protrusions 30a and the carrier 20 includes the holes 20a corresponding to the protrusions 30a, the protrusions 30a of the carrier holder 30 and the holes 20a of the carrier 20 are automatically coupled to each other when the probe 10 is attached to the carrier holder 30 even if the relative position of the first scanner 31 with respect to the tray 42 is not precise. As such, the probe 10 can be exactly attached onto the carrier holder 30.

To perform the function of automatic arrangement between the protrusions 30a of the carrier holder 30 and the holes 20a of the carrier 20, the protrusions 30a of the carrier holder 30 may have hemispherical shapes as shown in FIG. 2A. If the protrusions 30a of the carrier holder 30 are formed as hemispheres, the protrusions 30a of the carrier holder 30 can be slid into the holes 20a of the carrier 20 even when the positions of the protrusions 30a and the holes 20a do not coincide with each other. Then, the carrier to which the probe 10 is attached can be exactly attached to the carrier holder 30 automatically.

Meanwhile, although a plurality of protrusions 30a and a plurality of holes 20a can be formed, a proper attachment between the protrusions 30a of the carrier holder 30 and the holes 20a of the carrier 20 can be accomplished with at least only two protrusions 30a and two holes 20a.

In the SPM, according to the current embodiment of the present invention, the spare probe is stored in the tray 42. Additionally, unlike the conventional SPM, in which the probe is replaced manually by the user, the end portion of the first scanner 31 moves to the upper portion of the tray 42 so that the probe 10 can be automatically replaced as in the SPM of the current embodiment of the present invention, and thus, the convenience of using the SPM according to the present invention can be maximized.

Meanwhile, the position of the tray 42 that stores the spare probe is fixed. Therefore, when the user inputs a signal for replacing the probe 10 to the SPM, the end portion of the first scanner 31 can automatically move to the upper portion of the position of the tray 42 that is set in advance. Otherwise, the tray 42 can be formed on the second scanner 32 and the second scanner 32 moves in a predetermined path on the x-y plane so that the tray 42 can be located under the end portion of the first scanner 31. Hence, when the probe 10 is automatically replaced, the position of the probe 10 with respect to the carrier holder 30 at the end portion of the first scanner 31 may not be exactly arranged. However, according to the SPM of the current embodiment, the probe 10 can be automatically attached onto the exact location of the carrier holder 30 due to the protrusions 30a formed on the carrier holder 30 and the holes 20a formed in the carrier 20.

Figure 3A:
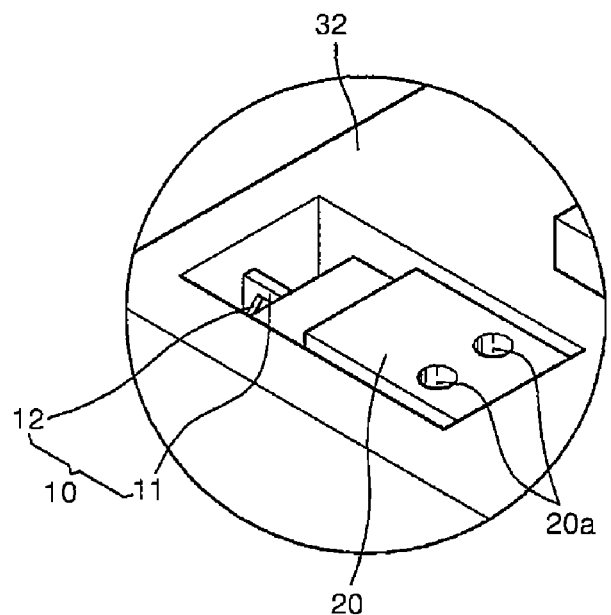
FIG. 3A is a schematic perspective view of portion B of FIG. 1, in which a carrier and a probe that is adhered to the carrier are stored in a tray, according to an embodiment of the present invention.

FIG. 3A is a schematic perspective view of portion B in FIG. 1, in which the carrier 20 and the probe 10, which is attached onto the carrier 20, are stored, according to an embodiment of the present invention. The spare probe that is to be attached onto the carrier holder 30 of the first scanner 31 is stored in the tray 42. A plurality of probes can be stored in the tray 42 unlike the example shown in FIG. 3A.

Figure 3B:
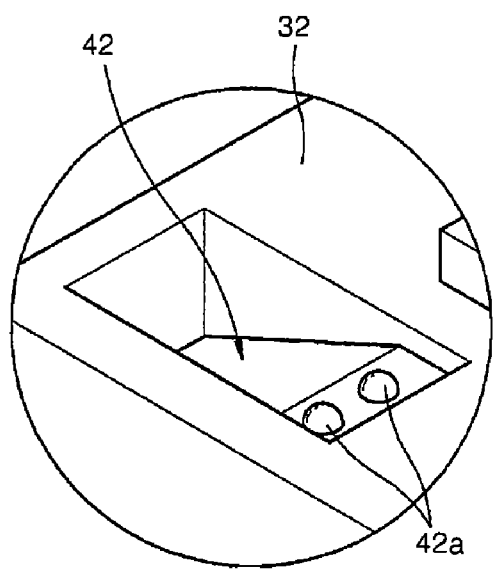
FIG. 3B is a perspective view of the tray shown in portion B of FIG. 1, in which a carrier and a probe that is attached to the carrier are not stored in a tray, according to an embodiment of the present invention.

FIG. 3B is a perspective view of a tray 42 as shown in portion B of FIG. 1, in which the carrier 20 and the probe 10, which is attached onto the carrier 20, are not stored in the tray 42, according to the embodiment of the present invention. Referring to FIG. 3B, the tray 42 includes a plurality of protrusions 42a. Thus, the carrier 20, to which the probe 10 is attached, stored in the tray 42 includes a plurality of holes or a plurality of recesses (hereinafter, referred to as holes) corresponding to the protrusions 42a of the tray 42. Therefore, when the carrier 20, to which the probe 10 is attached, is stored in the tray 42, the carrier 20 can be located at a fixed location in the tray 42.

The effects of the SPM according to the current embodiment are as follows. If the size of the tray 42 is equal to that of the probe 10 or the carrier 20 to which the probe 10 is attached, it is not easy to insert the probe 10 or the carrier 20 into the tray 42 or draw the probe 10 or the carrier 20 from the tray 42. Therefore, the tray 42 may be larger than the probe 10 or the carrier 20. However, if the tray 42 is larger than the probe 10 or the carrier 20, the probe 10 or the carrier 20 may not be stored at a fixed location in the tray 42. Then, when the probe 10 or the carrier 20, which is stored in the tray 42, is automatically attached to the carrier holder 30 at the end portion of the first scanner 31, the relative positions between the probe 10 or the carrier 20 in the tray 42 and the carrier holder 30 at the end portion of the first scanner 31 are not consistent with each other.

However, according to the SPM of the current embodiment, the protrusions 42a are formed in the tray 42, and the carrier 20, to which the probe 10 is attached, has the holes 20a corresponding to the protrusions 42a of the tray 42, and thus, the position of the probe 10 in the tray 42 can be fixed. Consequently, the probe 10 or the carrier 20, which is stored in the tray 42, can be exactly attached to the carrier holder 30 at the end portion of the first scanner 31.

Meanwhile, the carrier 20, to which the probe 10 is attached, includes the holes 20a corresponding to the protrusions 30a formed on the carrier holder 30 at the end portion of the first scanner 31, and thus, the holes 20a formed in the carrier 20 can correspond to both of the protrusions 30a and the protrusions 42a by forming the protrusions 42a formed in the tray 42 to have the same patterns as those of the protrusions 30a of the carrier holder 30. Furthermore, in order to stably store the probe 10 or the carrier 20 in the tray 42, the carrier 20 can be formed of a metal material and the tray 42 can be formed of a permanent magnet or an electromagnet, or the tray 42 can include a portion formed of a permanent magnet or an electromagnet. For example, the protrusions 42a of the tray 42 can be formed of a permanent magnet or an electromagnet. If the tray 42 is formed of a permanent magnet or includes a portion formed of a permanent magnet, the carrier holder 30 at the end portion of the first scanner 31 can be formed of a permanent magnet having a stronger magnetic force than that of the permanent magnet of the tray 42, and thus, the probe 10, which is stored in the tray 42, can be attached onto the carrier holder 30.

Figure 4:
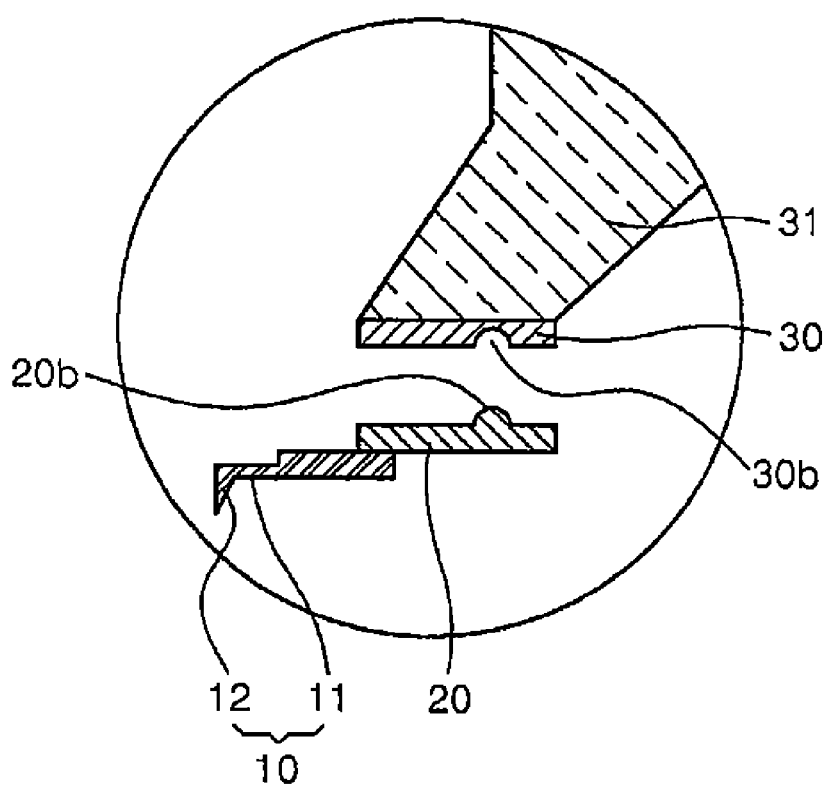
FIG. 4 is a cross-sectional view of a part of an SPM according to another embodiment of the present invention.

FIG. 4 is a cross-sectional view of a part of an SPM according to another embodiment of the present invention. In the SPM according to the previous embodiment, the of protrusions 30a are formed on the carrier holder 30 at the end portion of the first scanner 31, and the carrier 20, to which the probe 10 is attached, includes the holes 20a or recesses corresponding to the protrusions 30a of the carrier holder 30. However, in the SPM according to the current embodiment, a plurality of recesses 30b are formed on the carrier holder 30 at the end portion of the first scanner 31, and a plurality of protrusions 20b, which correspond to the recesses 30b of the carrier holder 30, are formed on the carrier 20, to which the probe 10 is attached. According to the above structure, the probe 10 can be attached to the exact position of the carrier holder 30. The above structure can be modified variously, for example, a plurality of protrusions are formed on a lower surface of the carrier to which the probe is attached, and a plurality of recesses, which correspond to the protrusions of the carrier, are formed in the tray, and thus, the probe can be stored at the fixed location in the tray.

According to the SPM of the present invention, the probe can be automatically replaced, and the replacement probe can be attached onto an exact position.

Figure 5:
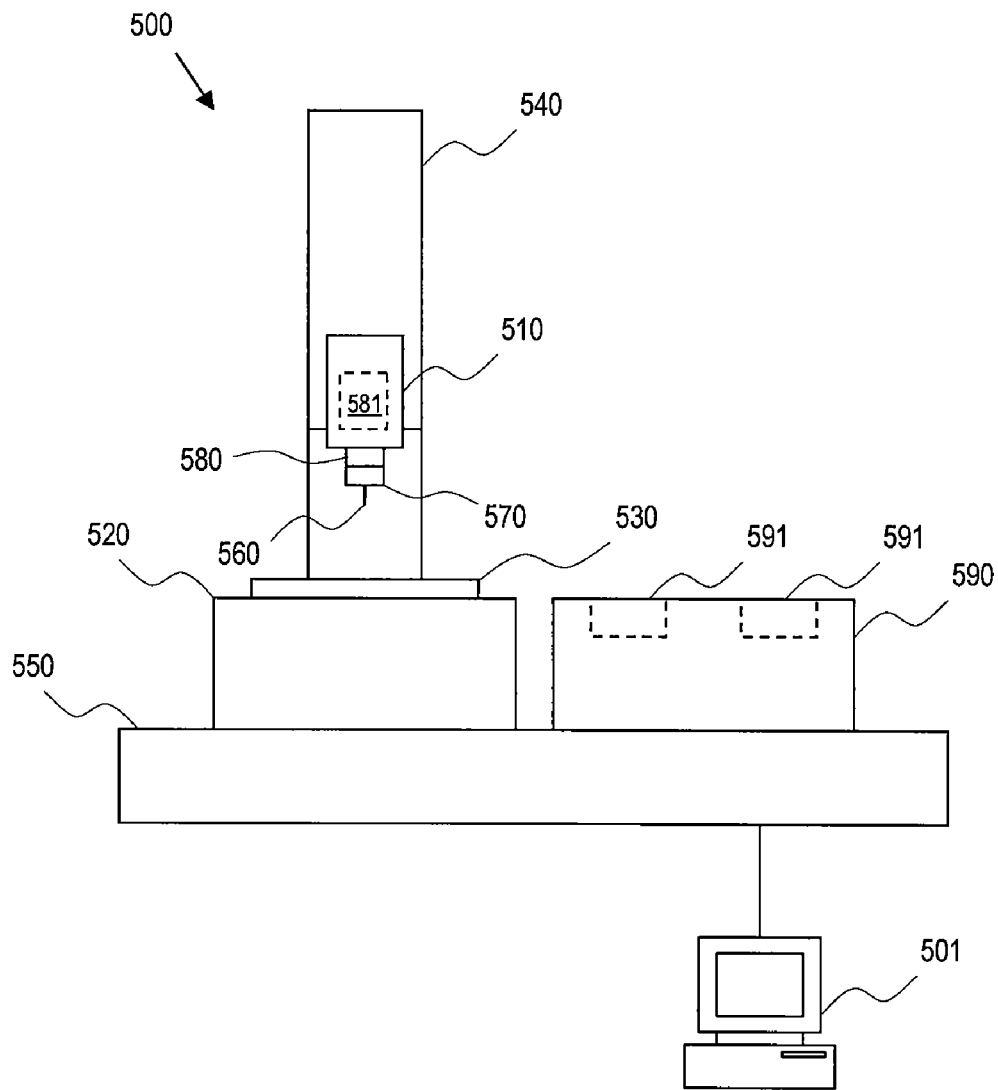
FIG. 5 is schematic front view of an SPM according to another embodiment of the present invention.

FIG. 5 is schematic front view of an SPM according to another embodiment of the present invention. The SPM 500 includes first and second scanners 510, 520. The first scanner 510 generally scans in the vertical direction and the second scanner 520 scans within a plane of a measurement sample 530. The first scanner is moved into and out of measurement position using a first positioning stage 540 and the second scanner is moved into and out of measurement position using a second positioning stage 550. A probe 560 of the SPM is mounted on a probe carrier 570, and the probe carrier 570 is attached to a probe carrier holder 580 of the first scanner 510. The first and second scanners 510, 520 and the first and second positioning stages 540, 550 are controlled by a computer system 501 that includes a processing unit, system memory, and other conventional components of a computing device.

A probe carrier tray 590 is shown adjacent to SPM 500. The probe carrier tray 590 has a plurality of bays 591, in each of which the probe carrier 570 and other probe carriers may be stored. The probe carrier tray 590 is also mounted on the second positioning stage 550 so that, during probe replacement or storage, the probe carrier tray 590 can be brought into position underneath the probe carrier holder 580.

Figure 6:
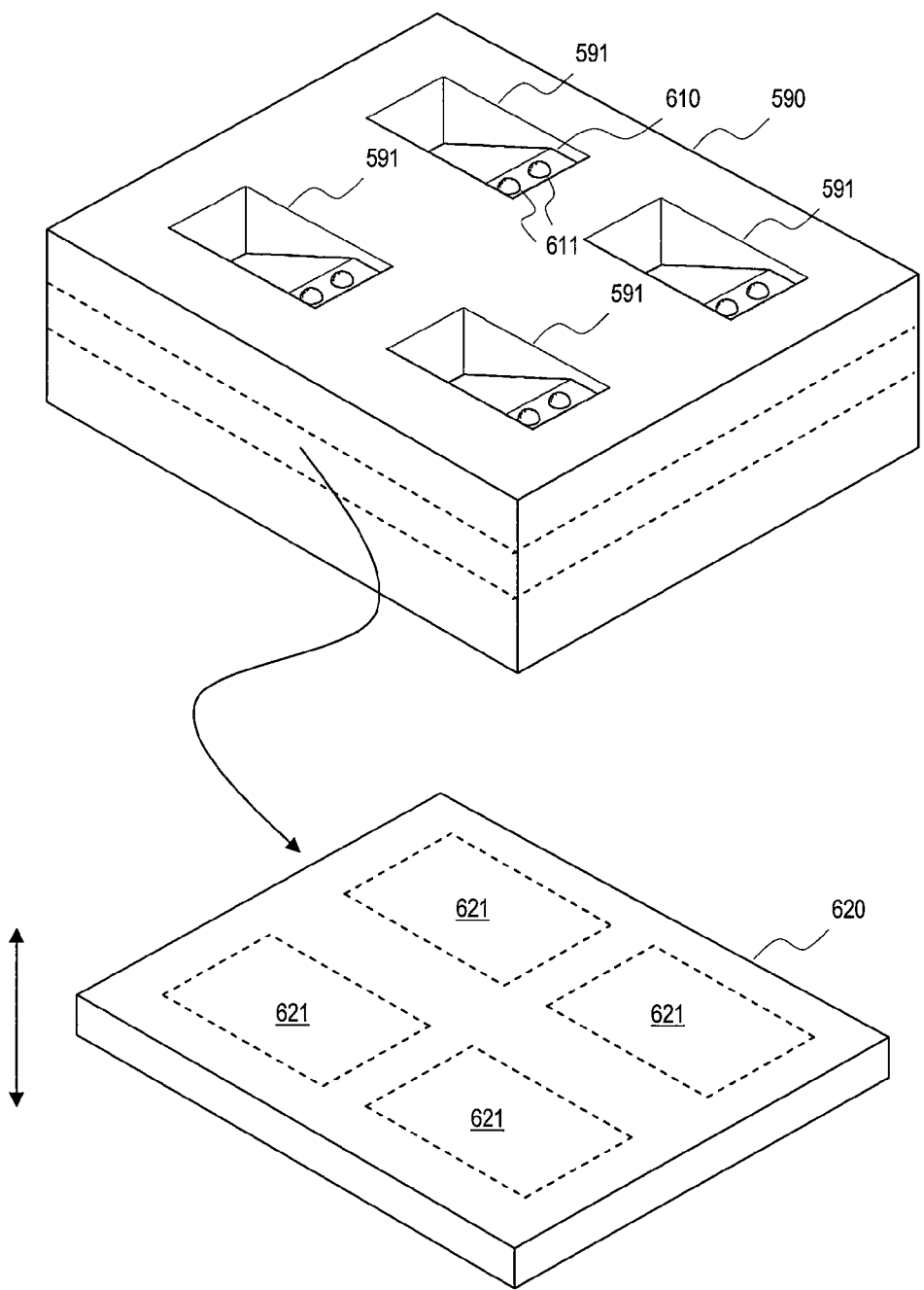
FIG. 6 is a perspective view of a probe carrier tray shown in FIG. 5.

FIG. 6 is a perspective view of a probe carrier tray shown in FIG. 5. In this embodiment of the present invention, the probe carrier tray 590 is shown to have four bays 591. The invention, however, is applicable to a probe carrier tray having any number of bays. Each bay 591 is configured with a probe carrier mount 610 onto which a probe carrier is mounted. The probe carrier mount 610 has a pair of projections 611 that engage corresponding through-holes formed on the probe carrier. Example configurations of probe carriers that may be stored in the probe carrier tray 590 include the ones shown in FIGS. 2A-2B, 7A-7D, 8A-8C, 11A-11B, and 12.

The probe carrier 570 or portions thereof is made of ferromagnetic material, and a permanent magnet 581 or alternatively, an electromagnet, is provided on the side of the probe carrier holder 580, so that the probe carrier 570 can attach to the probe carrier holder 580 by magnetic force. Similarly, a permanent magnet 621 or alternatively, an electromagnet, is provided on the side of the probe carrier mount 610, so that the probe carrier can attach to the probe carrier mount 610 by magnetic force.

In the embodiment of FIG. 6, one permanent magnet 621 is provided for each probe carrier mount 610, and all of the permanent magnets 621 are arranged on a platform 620. The platform 620 is positioned within the probe carrier tray 590 so that each permanent magnet 621 is underneath one of the probe carrier mounts 610. The platform 620 is configured to be raised and lowered so that the magnetic force acting on the probe carrier mounted onto the probe carrier mount 610 can be varied. Any mechanism for raising and lowering the platform may be used with the embodiments of the present invention, and such mechanism is also controlled by the computer system 501.

FIGS. 7A, 7B, 7C, and 7D illustrate an automatic probe replacement process according to an embodiment of the present invention. The illustrated process begins after the probe carrier 570 that is being replaced has been discarded or stored in the probe carrier tray 590 in the manner described below with reference to FIGS. 8A, 8B, and 8C.

Figure 7A:
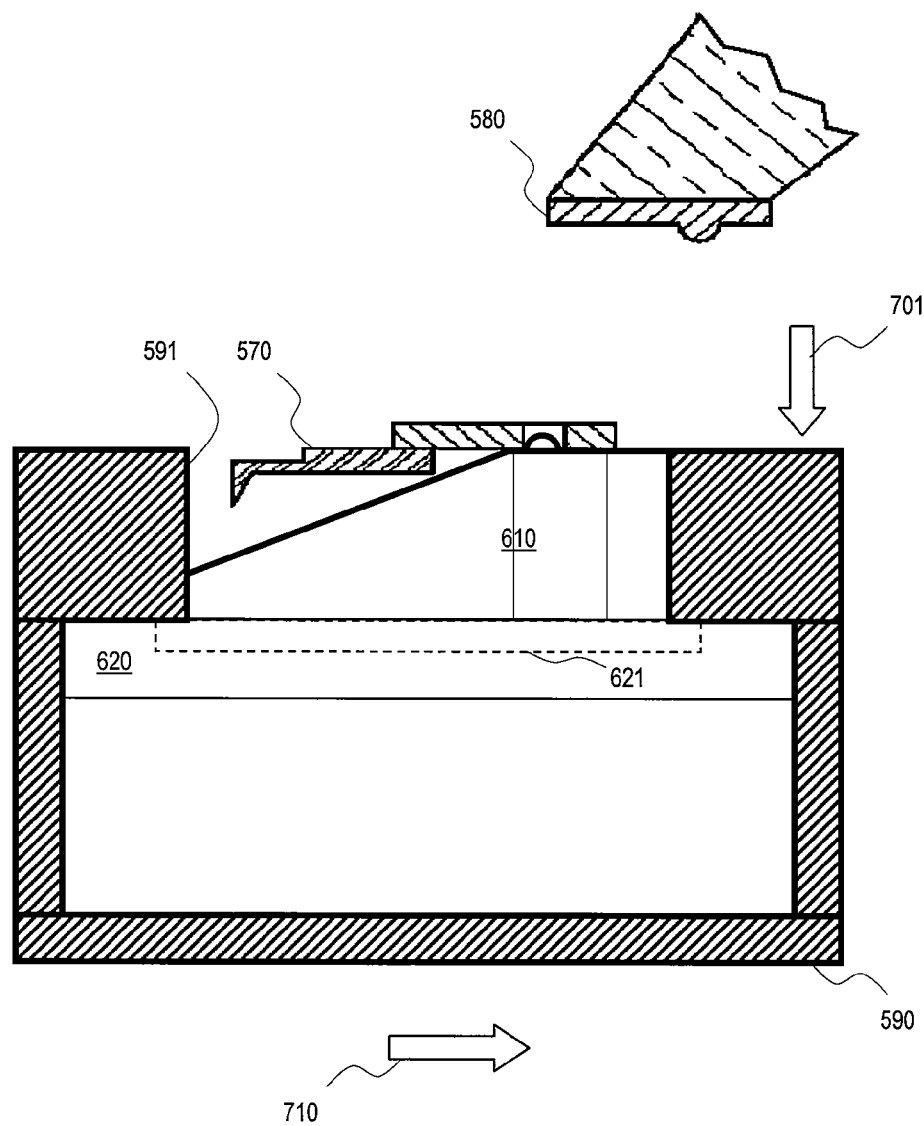
FIGS. 7A, 7B, 7C, and 7D illustrate an automatic probe replacement process according to an embodiment of the present invention.

FIG. 7A shows the probe carrier 570 mounted on the probe carrier mount 610 and held together by magnetic force, which is indicated by arrow 701. The process begins by positioning the probe carrier tray 590 using the second positioning stage 550. The movement of the probe carrier tray 590 by the second positioning stage 550 is indicated by arrow 710.

Figure 7B:
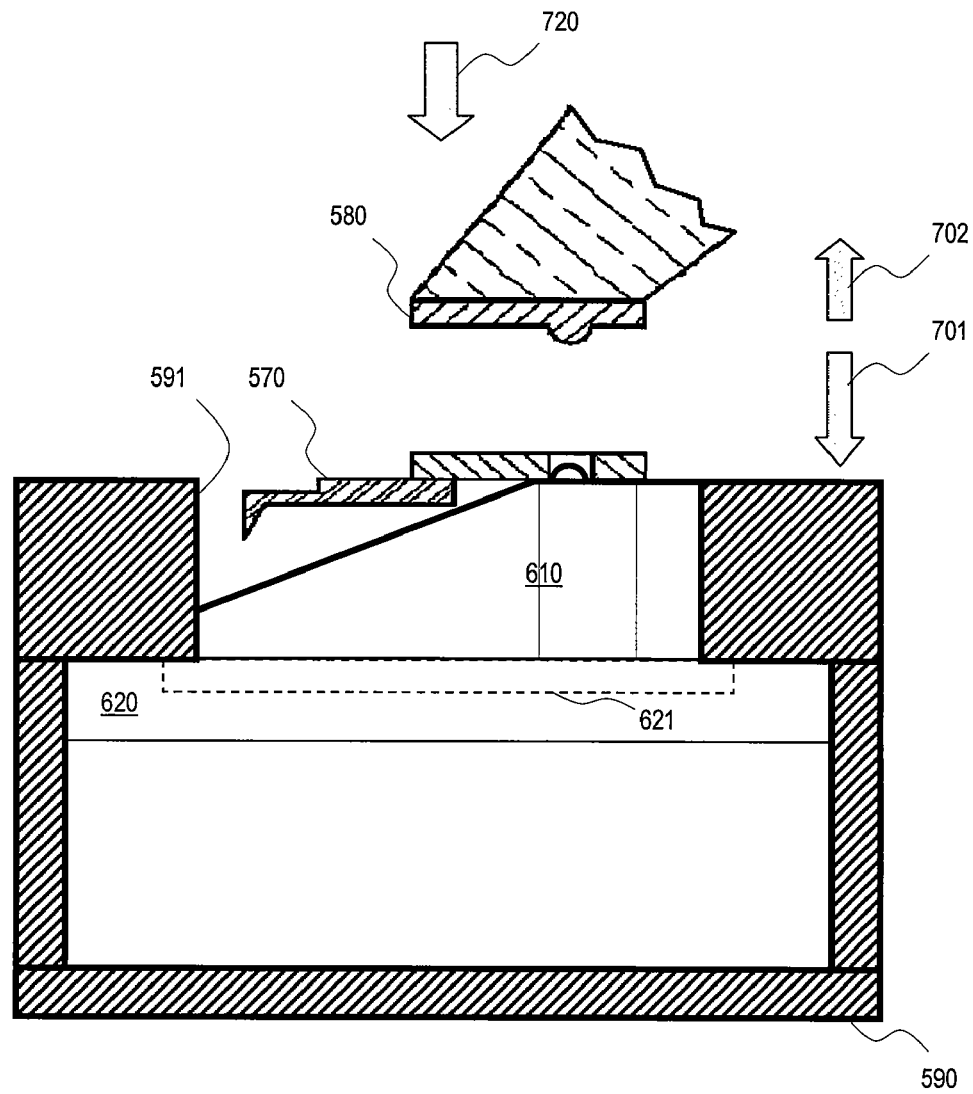

After the probe carrier tray 590 has been moved into proper position, i.e., underneath the probe carrier holder 580, the probe carrier holder 580 is lowered using the first positioning stage 540, as indicated by arrow 720 in FIG. 7B. As the probe carrier holder 580 is lowered, the magnetic force from permanent magnet 581 acting on the probe carrier 570 increases. The magnetic force from permanent magnet 581 acting on the probe carrier 570 is indicated by arrow 702. The magnitude of the magnetic force from permanent magnet 581 acting on the probe carrier 570, indicated by arrow 702, is, however, smaller than the magnitude of the magnetic force from permanent magnet 621 acting on the probe carrier 570, indicated by arrow 701. The relative magnitudes of the two magnetic forces indicated by arrows 701, 702 are represented by the lengths of the arrows 701, 702. Therefore, under the condition shown in FIG. 7B, the probe carrier 570 will remain attached to the probe carrier mount 610.

Figure 7C:
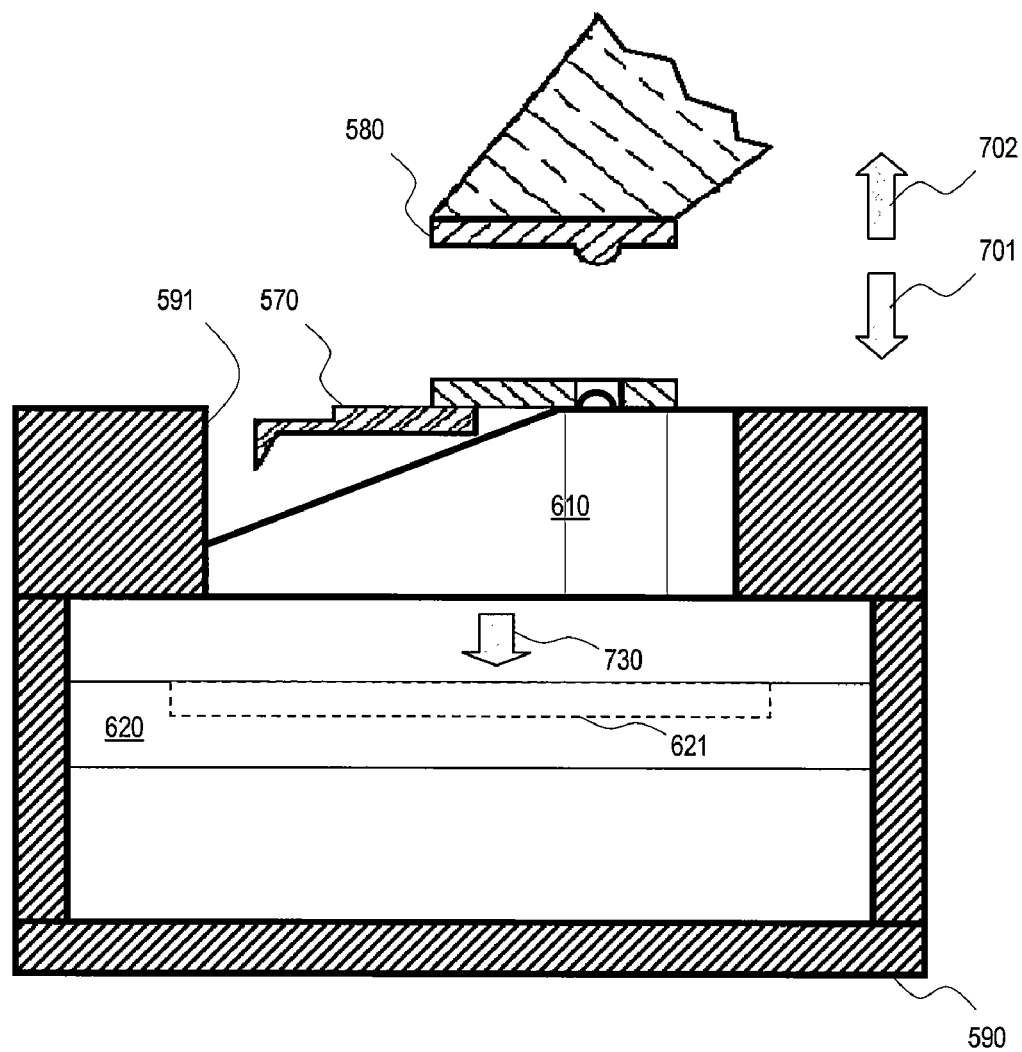
Figure 7D:
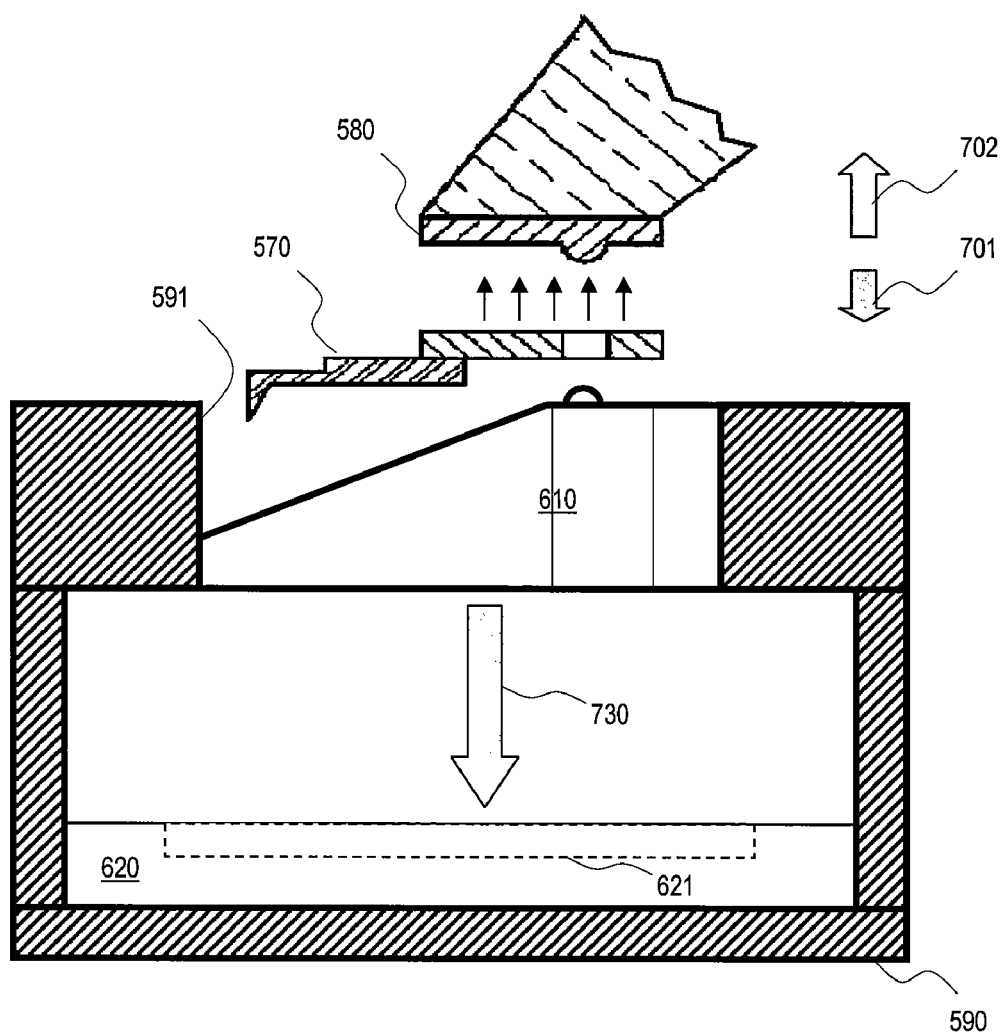

When the magnitude of the magnetic force from permanent magnet 581 acting on the probe carrier 570 is greater than the magnitude of the magnetic force from permanent magnet 621 acting on the probe carrier 570, the probe carrier 570 will release from the probe carrier mount 610 and attach to the probe carrier holder 580. To make this happen, the platform 620 is lowered as shown in FIG. 7C. The lowering of the platform 620, as indicated by arrow 730, causes the magnitude of the magnetic force from permanent magnet 621 acting on the probe carrier 570 to decrease. As shown in FIG. 7D, when the platform 620 is lowered all the way, the magnitude of the magnetic force from permanent magnet 621 acting on the probe carrier 570 has decreased sufficiently, and the probe carrier 570 releases from the probe carrier mount 610 to be attached to the probe carrier holder 580.

Figure 8A:
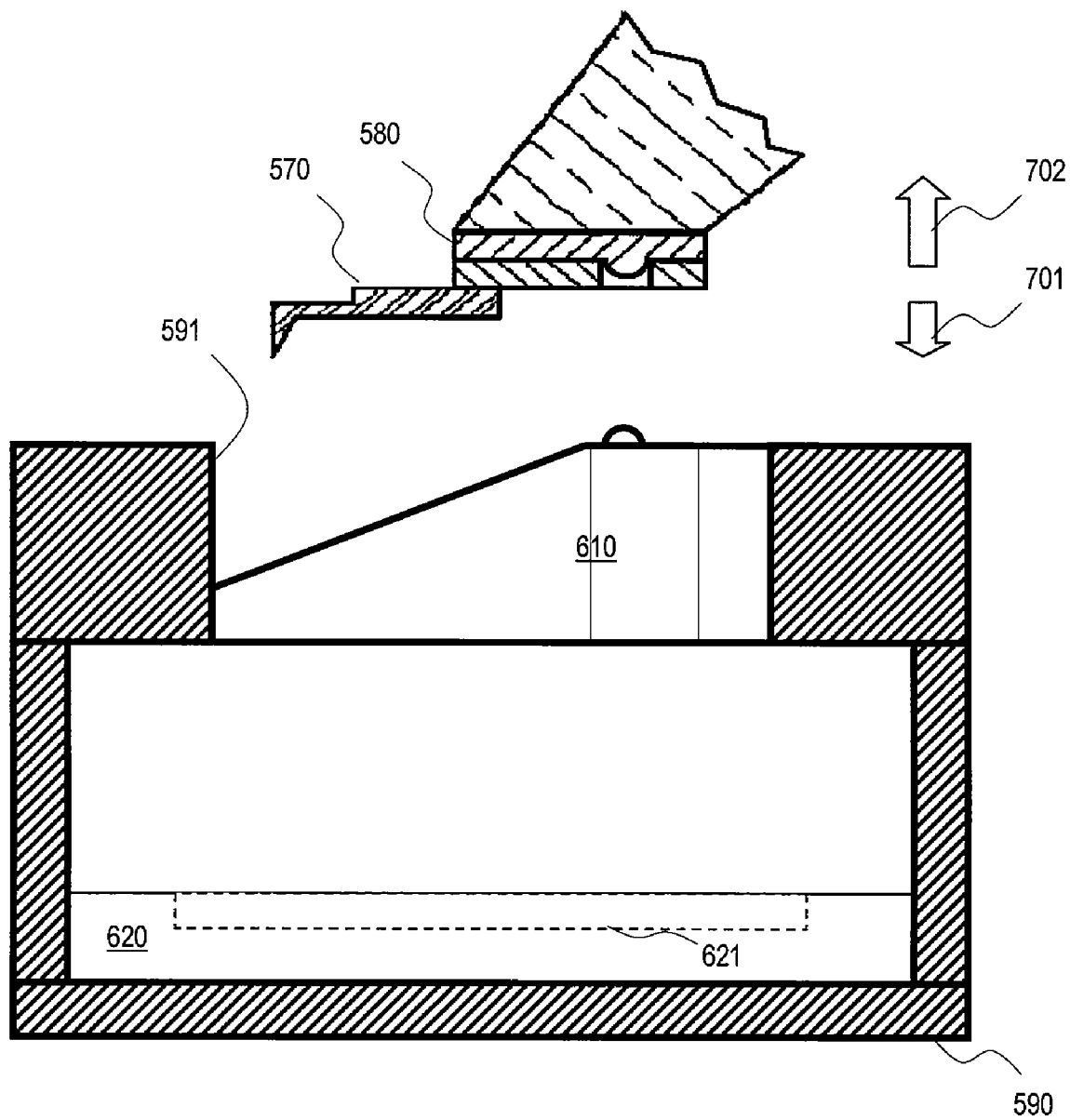
FIGS. 8A, 8B, and 8C illustrate an automatic probe storage process according to an embodiment of the present invention.
Figure 8B:
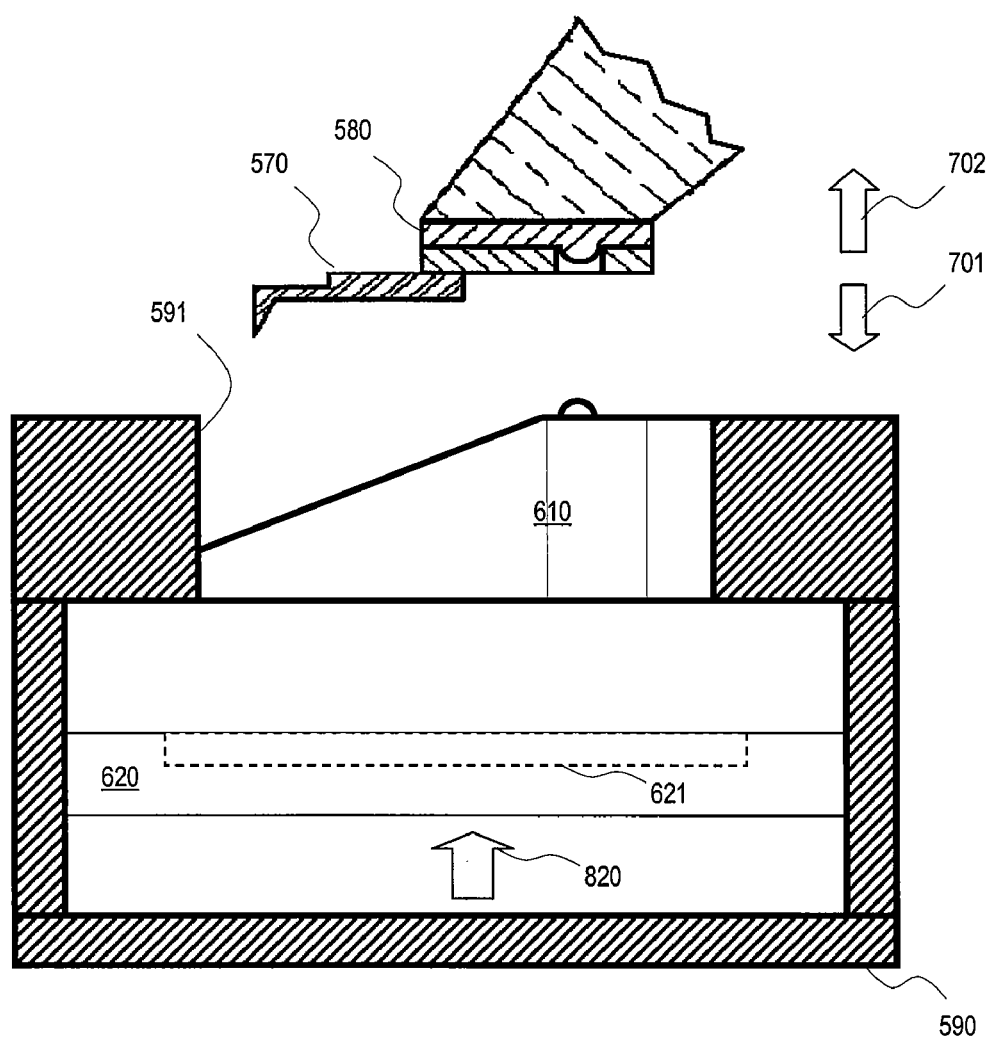
Figure 8C:
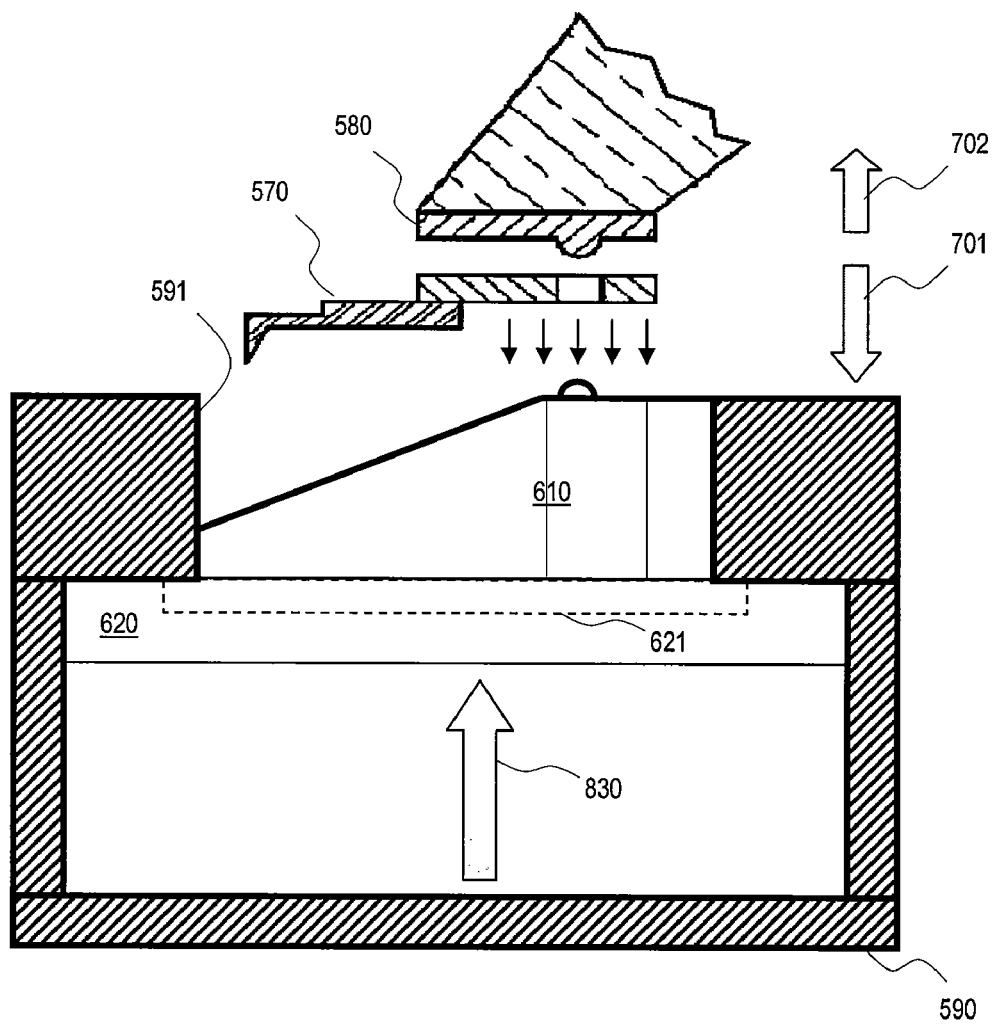

FIGS. 8A, 8B, and 8C illustrate an automatic probe storage process according to an embodiment of the present invention. The process begins by positioning the probe carrier tray 590 using the second positioning stage 550 so that the probe carrier 570 is positioned underneath an empty bay 591. FIG. 8A shows the probe carrier 570 in such a position and lowered into position for probe storage by first positioning stage 540.

In the position shown in FIG. 8A, the probe carrier 570 is held onto the probe carrier holder 580 by magnetic force from permanent magnet 581, as indicated by arrow 702. Magnetic force from permanent magnet 621 also acts on the probe carrier 570, as indicated by arrow 701, but the magnitude of this magnetic force is not large enough to cause the probe carrier 570 to release from the probe carrier holder 580 and attach to the probe carrier mount 610.

As a way to increase the magnetic force from permanent magnet 621, the platform 620 is raised as shown in FIG. 8B. The raising of the platform 620 is indicated by arrow 820. As the platform 620 is raised, the magnetic force from the permanent magnet 621 acting on the probe carrier 570 increases. As shown in FIG. 8C, when the platform 620 is raised all the way, the magnitude of the magnetic force from permanent magnet 621 acting on the probe carrier 570 becomes greater than the magnitude of the magnetic force from permanent magnet 581 acting on the probe carrier 570. The greater magnetic force from the permanent magnet 621 causes the probe carrier 570 to release from the probe carrier holder 580 and attach to the probe carrier mount 610 for storage.

Figures 9, 10:
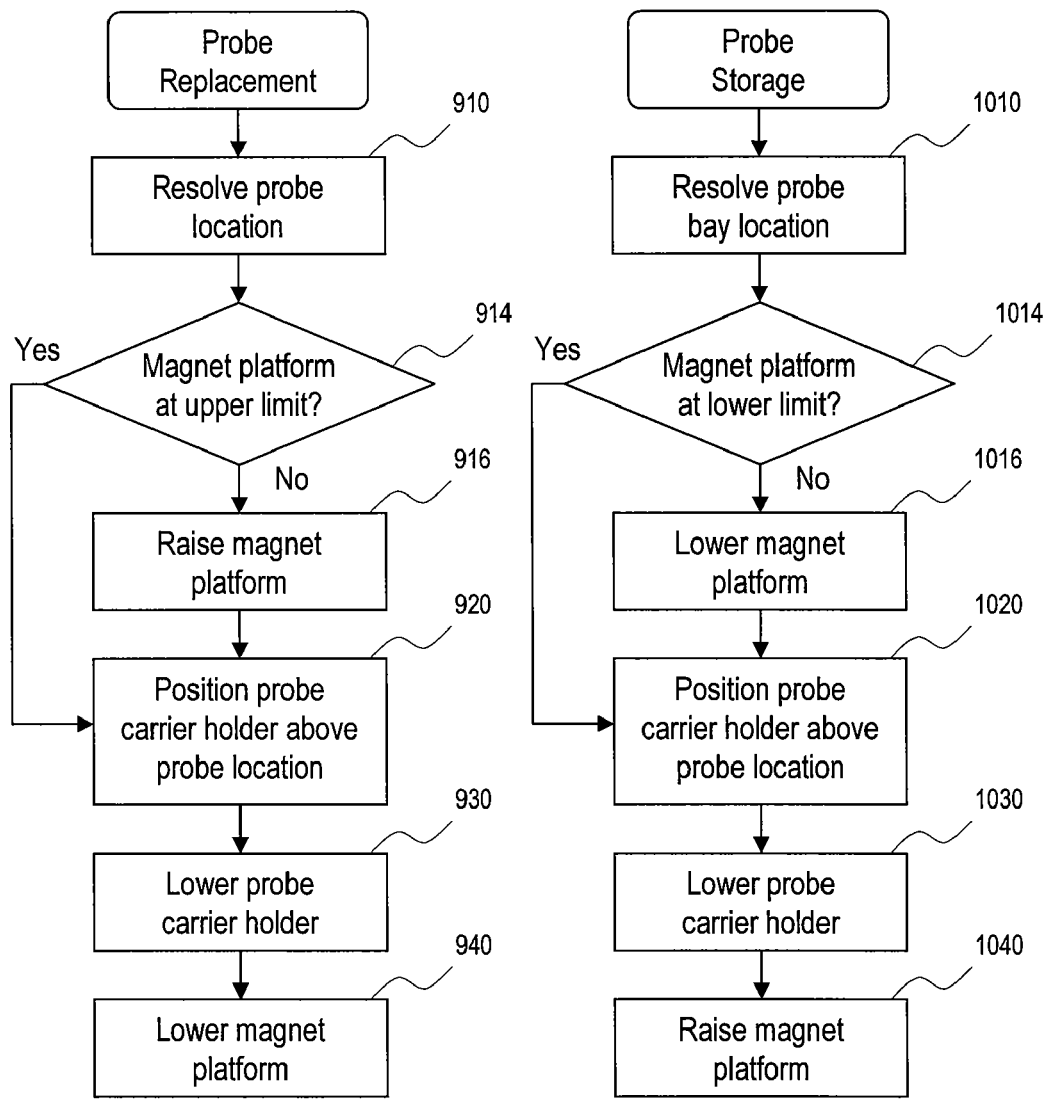
FIG. 9 is a flow diagram illustrating the steps executed by the computer system to carry out the probe replacement process.
FIG. 10 is a flow diagram illustrating the steps executed by the computer system to carry out the probe storage process.

The processes for probe replacement and probe storage described above are carried out in accordance with commands generated from the computer system 501 under software control. FIG. 9 is a flow diagram illustrating the steps executed by the computer system 501 to carry out the probe replacement process. FIG. 10 is a flow diagram illustrating the steps executed by the computer system 501 to carry out the probe storage process.

The probe replacement process of FIG. 9 begins with the SPM operator inputting identifying information for a probe and initiating execution of the probe replacement software in the computer system 501. In step 910, the computer system 501 resolves the exact location of the probe in the probe carrier tray 590 based on the identifying information. In step 914, the computer system 501 confirms that the platform 620 is at its upper limit. If not, the computer system 501 controls the platform 620 to be raised to its upper limit (step 916). Then, under control of the computer system 501, the second positioning stage 550 positions the probe carrier holder 580 to be above the location resolved in step 910 (step 920) and the first positioning stage 540 lowers the probe carrier holder 580 so that it is a predetermined distance above the probe carrier tray 590 (step 930). In step 940, the computer system 501 controls the platform 620 to be lowered to its bottom limit. At a certain point during this step, the probe carrier 570 is released from the probe carrier mount 610 and attached to the probe carrier holder 580.

The probe storage process of FIG. 10 begins with the SPM operator inputting a bay location in the probe carrier tray 590 for storing the probe and initiating execution of the probe storage software in the computer system 501. In step 1010, the computer system 501 resolves the exact location of the bay in the probe carrier tray 590 based on the input. In step 1014, the computer system 501 confirms that the platform 620 is at its lower limit. If not, the computer system 501 controls the platform 620 to be lowered to its bottom limit (step 1016). Then, under control of the computer system 501, the second positioning stage 550 positions the probe carrier holder 580 to be above the location resolved in step 1010 (step 1020) and the first positioning stage 540 lowers the probe carrier holder 580 so that it is a predetermined distance above the probe carrier tray 590 (step 1030). In step 1040, the computer system 501 controls the platform 620 to be raised to its upper limit. At a certain point during this step, the probe carrier 570 is released from the probe carrier holder 580 and attached to the probe carrier mount 610.

Figure 11A:
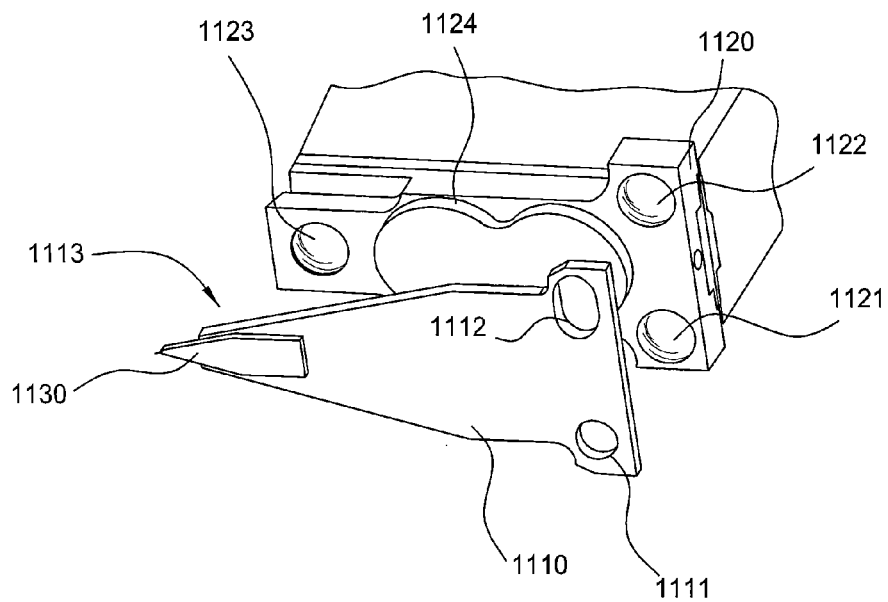
FIG. 11A is an exploded view of an alternative configuration of a probe carrier holder and a probe carrier.
Figure 11B:
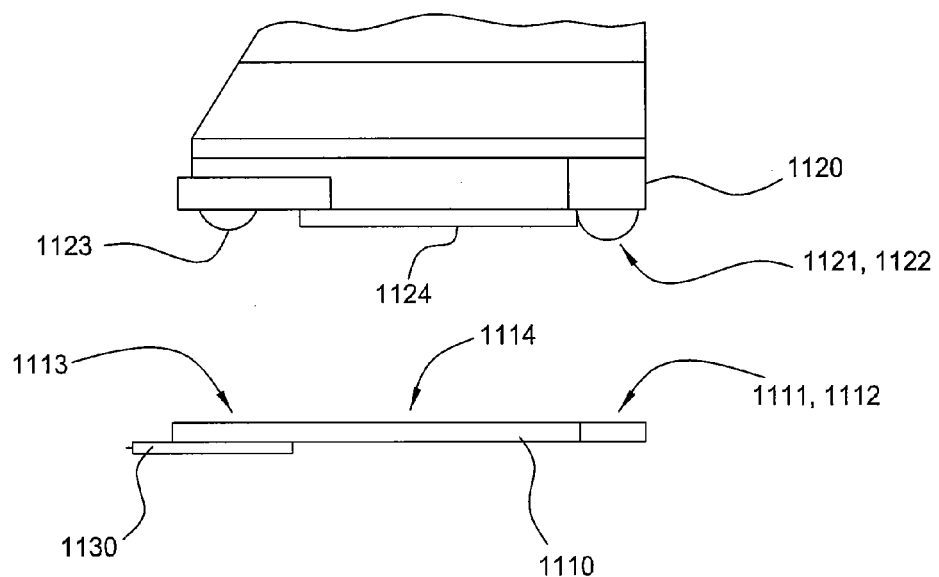
FIG. 11B is a side view of the probe carrier holder and the probe carrier of FIG. 11A.
Figure 12:
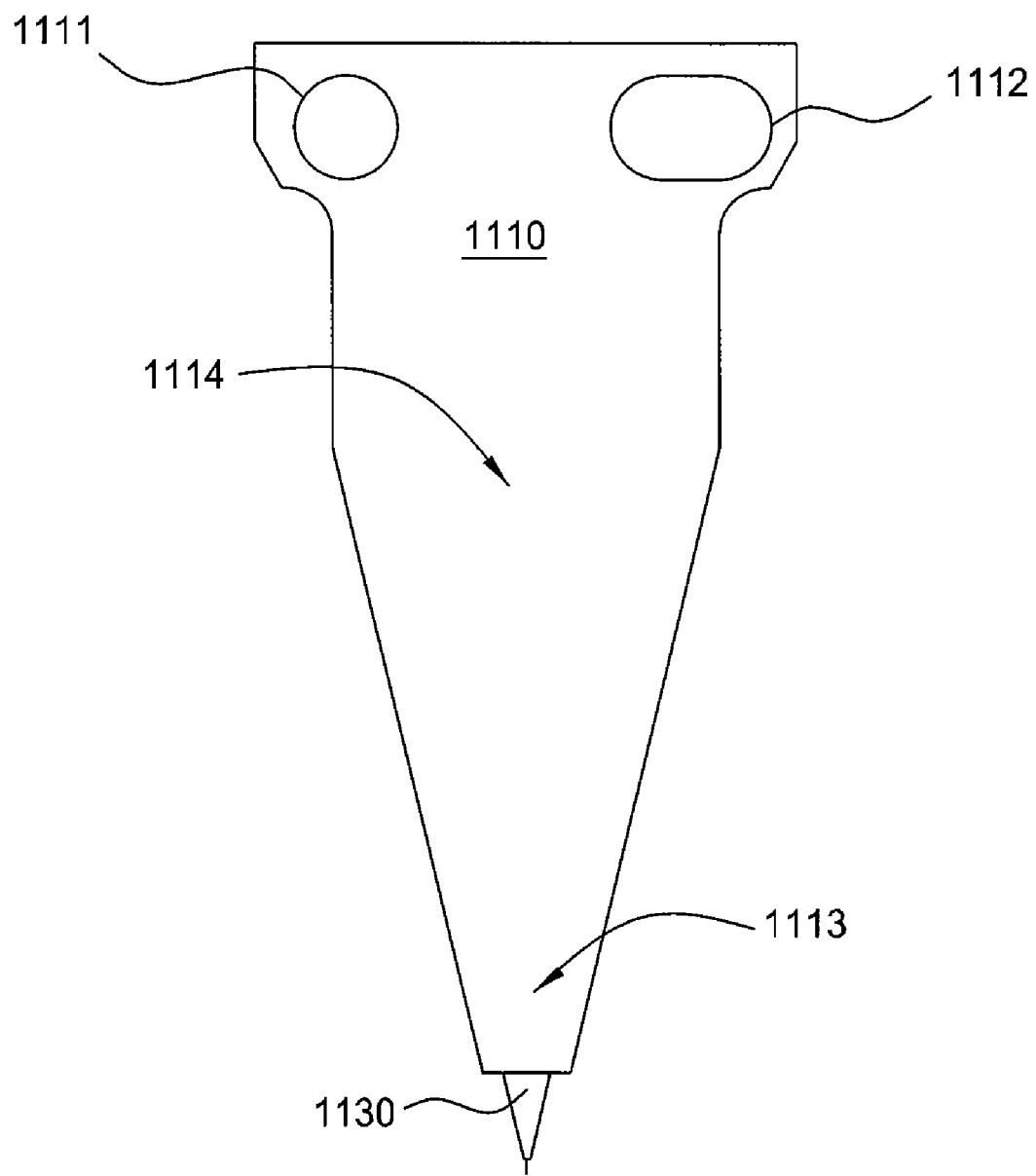
FIG. 12 is a plan view of the probe carrier of FIG. 11A.

FIG. 11A is an exploded view of an alternative configuration of a probe carrier holder and a probe carrier that may be used in the SPM of FIG. 1 or FIG. 5. In this alternative configuration, a probe carrier 1110, which has a probe 1130 attached thereto, and a probe carrier holder 1120 are coupled via a kinematic mount. The kinematic mount includes projections 1121, 1122, 1123 formed on the probe carrier holder 1120 and corresponding engagement portions 1111, 1112, 1113 formed on the probe carrier 1110. The projections 1121, 1122, 1123 are formed as hemispherical projections. The engagement portion 1111 is formed as a circular slot. The engagement portion 1112 is formed as an elliptical slot. The engagement portion 1123 is formed as a flat surface. In addition, the probe carrier holder 1120 has a protruding magnetic surface 1124 onto which a corresponding planar surface 1114 of the probe carrier 1110 is attached by magnetic force. FIG. 11B is a side view of the probe carrier holder 1120 and the probe carrier 1110, and FIG. 12 is a plan view of the probe carrier 1120.

In the kinematic mount, the coupling of hemispherical projection 1121 and the engagement portion 1111 defines the X and Y position of the probe carrier 1110 relative to the probe carrier holder 1120. The rotation about the Z axis of the probe carrier 1110 relative to the probe carrier holder 1120 is constrained by the coupling of hemispherical projection 1122 and the engagement portion 1112. The Z position of the probe carrier 1110 relative to the probe carrier holder 1120 is defined by the coupling of hemispherical projection 1123 and the engagement portion 1113. With this arrangement, the probe carrier 110 can be repeatedly positioned on the probe carrier holder 1120 with high accuracy.

The projections 1121, 1122, 1123 and the engagement portions 1111, 1112, 1113 may have other configurations so long as the coupling of the projections with the engagement portions results in a kinematic mount. For example, the engagement portion 1111 may be formed as a conic groove and the engagement portion 1112 may be formed as a V-groove.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. In a scanning probe microscope having a probe attachment portion and a magnet, a method for automatically installing a probe on the probe attachment portion by a first magnetic force generated by the magnet, comprising the steps of:
    positioning the probe attachment portion relative to a probe that is attached by a second magnetic force to a probe tray that holds a plurality of other probes by magnetic force; and
    after the probe attachment portion has been positioned above the probe, maintaining the second magnetic force on the probe but decreasing the second magnetic force on the probe to be less than the first magnetic force so that the probe releases from the probe tray and attaches to the probe attachment portion.

2. The method according to claim 1, further comprising the steps of:
    receiving an input of identifying information of the probe to be installed on the probe attachment portion; and
    determining a location of the probe in the probe tray,
    wherein the probe attachment portion is positioned above the probe based on the determined location.

3. The method according to claim 1, wherein the step of positioning includes:
    moving the probe attachment portion relative to the probe within a horizontal plane until the probe attachment portion is above the probe; and
    moving the probe attachment portion vertically closer to the probe.

4. The method according to claim 1, wherein the probe tray includes a magnet that generates the second magnetic force and the step of decreasing includes moving the magnet to a position that is further from the probe.

5. The method according to claim 1, wherein the probe tray includes a magnet platform positioned below the probe and the other probes, and the step of decreasing includes lowering the position of the magnet platform.

6. The method according to claim 1, wherein the probe attaches to the probe attachment portion via a kinematic mount.

7. In a scanning probe microscope having a probe attachment region and a probe attached to the probe attachment region by a first magnetic force, a method for automatically storing a probe, comprising the steps of:
positioning the probe above a probe tray having a plurality of bays in which probes are to be stored; and
after the probe has been positioned above a selected one of the bays, generating a second magnetic force by which the probe is to attach to the probe tray, the second magnetic force being greater than the first magnetic force so that the probe releases from the probe attachment region and attaches to the probe tray.

8. The method according to claim 7, further comprising the steps of:
receiving an input relating to the selected bay in which the probe is to be stored; and
determining a location of the selected bay in the probe tray.

9. The method according to claim 7, wherein the step of positioning includes:
moving the probe relative to the probe tray within a horizontal plane until the probe is above the selected bay; and
moving the probe vertically closer to the selected bay.

10. The method according to claim 7, wherein the probe tray includes a magnet platform having one or more magnets that generate the second magnetic force.

11. The method according to claim 10, wherein the step of generating includes moving the magnet platform closer to the selected bay.

12. The method according to claim 7, wherein the probe attachment region has an associated magnet that generates the first magnetic force.

13. A probe exchange system for a scanning probe microscope, comprising:
a first probe mount configured on the scanning probe microscope to hold a probe thereon by a first magnetic force;
a plurality of second probe mounts configured on a probe tray to hold probes thereon by a second magnetic force;
a first magnet for generating the first magnetic force; and
a second magnet for generating the second magnetic force, wherein the second magnet is mounted on a plafform that is movable relative to the second probe mounts to vary the second magnetic force.

14. The probe exchange system according to claim 13, wherein the first probe mount is movable relative to the probe tray so that the first probe mount can be positioned above any one of the second probe mounts.

15. The probe exchange system according to claim 13, wherein the second probe mounts are disposed on top of the platform and the plafform is movable vertically.

16. The probe exchange system according to claim 13, wherein the first probe mount and the second probe mount have protrusions that have substantially the same configuration.

17. The probe exchange system according to claim 16, wherein the probe includes a carrier portion having grooves that engage with the protrusions.

18. The probe exchange system according to claim 13, wherein the first probe mount has protrusions and the probe includes a carrier portion having grooves that engage with the protrusions to define a kinematic mount.

19. The probe exchange system according to claim 13, wherein the first probe mount has protrusions and the probe includes a carrier portion having a circular slot and an elliptical slot, and wherein a first one of the protrusions engages with the circular slot, a second one of the protrusions engages with the elliptical slot, and a third of the protrusions engages with a flat surface on the carrier portion.

* * * * *